J. A. KIRKHAM.
LOCK FOR STEERING GEAR OF CONVEYANCES.
APPLICATION FILED AUG. 5, 1914.

1,175,273.

Patented Mar. 14, 1916.

WITNESSES:
Wm. P. Schmitt
Cecil Long

INVENTOR
John A. Kirkham,
BY
T. J. Geisler
ATTORNEY

UNITED STATES PATENT OFFICE.

JOHN A. KIRKHAM, OF PORTLAND, OREGON, ASSIGNOR OF ONE-HALF TO WILLIAM H. BEHARRELL, OF PORTLAND, OREGON.

LOCK FOR STEERING-GEAR OF CONVEYANCES.

1,175,273.  Specification of Letters Patent.  Patented Mar. 14, 1916.

Application filed August 5, 1914. Serial No. 855,296.

*To all whom it may concern:*

Be it known that I, JOHN A. KIRKHAM, a citizen of the United States, and a resident of the city of Portland, county of Multnomah, State of Oregon, have invented a certain new and useful Improvement in Locks for Steering-Gear of Conveyances, of which the following is a specification.

My invention relates to the steering gear of self propelling vehicles and boats, and has for its object the providing of simple lock-controlled means by which the steering gear may be rendered inoperative, that is to say, locked against rotation, and thus render the vehicle unfit for service, and protecting it against being tampered with, and the conveyance from being stolen.

A further object of my invention is to provide a locking mechanism which can be readily applied to the steering gear of standard makes of automobiles.

Figure 2:
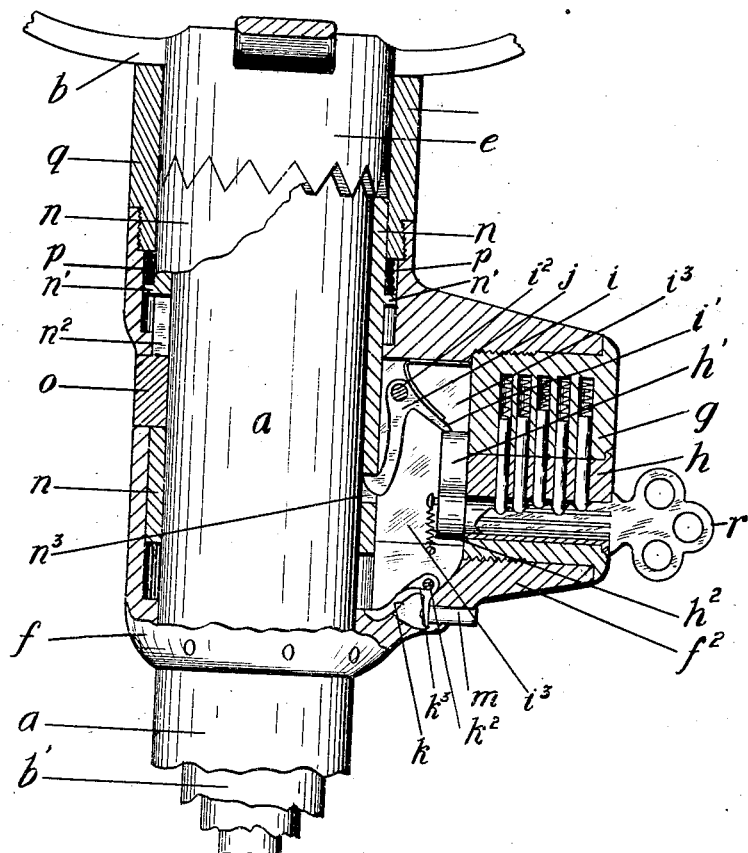
Figure 3:
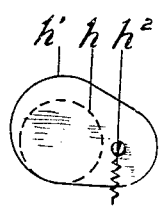
Figure 1:
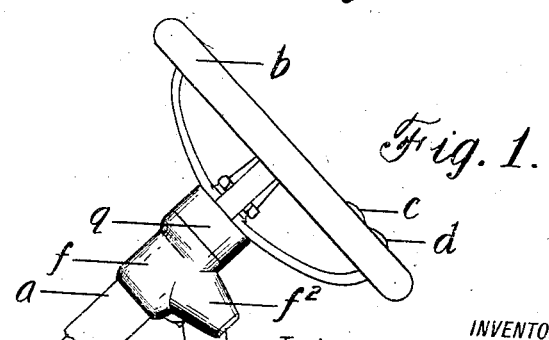

The means by which I attain my object are more readily described by having reference to the accompanying drawings, in which:

Figure 1 is a side elevation showing the steering wheel and the column or casing in which the post of the latter rotates; these parts being shown to represent like devices in one of the standard types of automobiles, and my steering wheel locking mechanism is shown as applied in practice; Fig. 2 shows the upper portion of the column in which the steering wheel post rotates, and shows in section the means provided by me for locking the steering wheel against rotation; and Fig. 3 is a detail of construction.

$a$ represents a fixed tubular column or casing inclosing the tubular post $b'$ of the steering wheel $b$, and $c$, $d$, the usual spark and throttle control levers. The housing $f$ incloses the coöperating devices of my invention. This housing may consist of a casting which is either shrunk on, or riveted or otherwise fixed on the casing $a$, so as to become a fixed part of the latter.

The devices shown by me for locking the steering post are of the clutch type, but of course I do not limit myself specifically to these.

On the steering wheel is fixed a fixed collar or clutch member $e$, having its lower end serrated.

A sleeve or movable clutch member $n$ is reciprocable in the housing $f$. The head or upper part of the sleeve $n$ is serrated so as to be adapted for being interlocked with the serrated lower end of the collar $e$. To limit the sliding movement of the sleeve $n$, and also to hold the same against rotation, the housing $f$ is provided with an internal lug $o$, bearing in the slot $n^2$ of the sleeve $n$. An annular nut $q$ is screwed into the upper end of the housing $f$ and provides a bearing for the upper end of an expansion coil spring $p$, the lower end of which is seated on a peripheral collar $n'$ of the sleeve $n$. The spring $p$ tends normally to hold the serrated head or top of the sleeve $n$ out of engagement with the serrated lower end of the collar $e$. The devices for holding the sleeve or movable clutch member $n$ in engagement with the fixed collar or clutch member $e$ consists of a pawl or latch $i$, pivoted on a pin $i^2$, in the chamber $i^3$ of the housing portion $f^2$, and said pawl is controlled by a spring $j$, as shown in Fig. 2. The sleeve $n$ has a slot $n^3$ in alinement with the pawl $i$.

A lock $g$, which may be of the pin-cylinder-lock type, is located in the housing portion $f^2$ and includes a rotatable cylinder $h$. A cam $h'$ is fixed on the cylinder $h$, and to the latter is fastened a spring $h^2$, which acts to place the cylinder $h$ in its normal state, and will reversely rotate such cylinder, after having been rotated by the key $r$ to unlock the steering post, as soon as the key $r$ is withdrawn or released. Said pawl or latch $i$ has an arm $i'$ arranged to be engaged by the cam $h'$ of the lock cylinder $h$.

At the lower end of the housing $f$ is a lifting bell crank $k$, pivoted on a pin $k^2$ in said chamber $i^3$. Said bell crank has an arm normally held in the position shown by a spring $k^3$. A projecting push button $m$ is fastened on the outer arm of the lifting bell crank $k$ and provides convenient means for rocking the latter so as to lift the sleeve $n$ against the spring $p$ into engagement with the collar $e$. When the sleeve $n$ has been lifted to its highest position, as shown in Fig. 2, said pawl $i$ will enter the slot $n^3$ of the sleeve $n$ and hold the latter against downward movement, and thus render the steering gear inoperative.

To unlock the locking mechanism, the key $r$ is inserted in the lock, and the lock-cylinder $h$ turned so as to cause the cam $h'$ of the lock-cylinder $h$ to bear against the arm $i'$ of the pawl or latch $i$, and thus rotate the latter counter-clockwise. This action withdraws the pawl $i$ from the slot $n^3$ of the sleeve $n$, which will thereupon be thrown out of its engagement with the collar $e$ by the action of the spring $p$, and the clutch engagement between the collar $e$ and the sleeve $n$ will be interrupted, permitting the steering wheel to be operated as usual.

I claim:

1. In a steering gear of the character described, the combination with the steering post, of a lock for holding the latter against being rotated, and comprising a clutch, one element of which is fixed on the steering post and the other being movable on the tubular column in which the steering post rotates; a spring operating to throw the movable clutch element in inactive position; a spring-controlled pivoted arm operable for moving said clutch element into its active position; spring-controlled means for locking said movable clutch element in place, when in its active position; and key-actuated means for releasing said movable clutch element from said locking means.

2. In a steering gear of the character described, the combination with the steering post of a lock for holding the latter against rotation, and comprising a clutch, one element of which is fixed on the steering post and the other longitudinally movable parallel with the axis of the steering post and on the tubular column in which the steering post rotates, a spring operating to throw the movable clutch element into its unlocked position, said clutch element being provided with a slot, a spring-controlled pawl adapted for entering said slot when the movable clutch element is in its locked position; a key-actuated lock including a spring-controlled rotatable cylinder, a cam on such cylinder, and a member on said pawl adapted for said cam to bear against when said cylinder is rotated.

JOHN A. KIRKHAM.

Witnesses:
W<small>M</small>. C. S<small>CHMITT</small>,
C<small>ECIL</small> L<small>ONG</small>.